(12) United States Patent
Tonnelier et al.

(10) Patent No.: US 9,117,150 B2
(45) Date of Patent: Aug. 25, 2015

(54) OPTICAL-READING CODE PREPARATION DEVICE

(75) Inventors: Laurent Tonnelier, Paris (FR); Ludovic Lebas, Melun (FR)

(73) Assignee: MOBILEAD, Paris (FR)

( * ) Notice: Subject to any disclaimer, the term of this patent is extended or adjusted under 35 U.S.C. 154(b) by 2 days.

(21) Appl. No.: 14/238,974

(22) PCT Filed: Aug. 2, 2012

(86) PCT No.: PCT/FR2012/000325
§ 371 (c)(1),
(2), (4) Date: Apr. 10, 2014

(87) PCT Pub. No.: WO2013/024211
PCT Pub. Date: Feb. 21, 2013

(65) Prior Publication Data
US 2014/0299669 A1    Oct. 9, 2014

(30) Foreign Application Priority Data
Aug. 16, 2011 (FR) ...................................... 11 02520

(51) Int. Cl.
*G06K 1/00* (2006.01)
*G06K 19/06* (2006.01)
*G06K 1/12* (2006.01)

(52) U.S. Cl.
CPC .......... *G06K 19/06103* (2013.01); *G06K 1/121* (2013.01); *G06K 19/06037* (2013.01)

(58) Field of Classification Search
CPC ...................................................... G06K 1/121
USPC ................................................... 235/487–495
See application file for complete search history.

(56) References Cited

U.S. PATENT DOCUMENTS

| 7,025,269 B2 | 4/2006 | Marshall |
| 7,207,491 B2 | 4/2007 | Lubow |
| 2006/0215931 A1 | 9/2006 | Shimomukai |

OTHER PUBLICATIONS

English Translation of the International Preliminary Report on Patentability, IB, Geneva, issued Feb. 18, 2014, incorporating the English Translation of the Written Opinion of the ISA, ISA/EP mailed Nov. 9, 2012.

*Primary Examiner* — Christle I Marshall
(74) *Attorney, Agent, or Firm* — Harness, Dickey & Pierce, P.L.C.

(57) ABSTRACT

An optical-reading code preparation device includes: a storage unit able to receive data to be coded, and parameter data including presentation data, an encoding unit, able to produce code data on the basis of data to be coded and of parameter data, an imaging unit, able to produce data defining an image plane on the basis of presentation data and/or of code data, a scheduler devised so as to, in response to the receipt of data to be coded and of parameter data comprising presentation data: call the encoding unit with the data to be coded and the parameter data received so as to produce associated code data, call the imaging unit with the associated code data, selectively with some at least of the presentation data, call the imaging unit, and prepare an optical-reading code.

10 Claims, 5 Drawing Sheets

OPTICAL-READING CODE PREPARATION DEVICE

CROSS-REFERENCE TO RELATED APPLICATIONS

This application is a National Phase Entry of International Application No. PCT/FR2012/000325, filed on Aug. 2, 2012, which claims priority to French Patent Application Serial No. 1102520, filed on Aug. 16, 2011, both of which are incorporated by reference herein.

BACKGROUND AND SUMMARY

The invention relates to the field of preparation of optical-reading codes.

An optical-reading code is a symbology, i.e. a graphic representation of a set of data. Various formats have been proposed to codify the production of an image that bijectively corresponds to input data. For example Datamatrix (ISO/IEC 16022), Maxicode (ISO/IEC 16023), QR-Code (ISO/IEC 18004), among others, are among such formats.

The output image is composed of a set of square-shaped black and white dots called modules. These points define a flat file, also called a matrix, from which the original data can be recovered.

Optical-reading codes are very advantageous since they can store a large amount of data on a limited area, and in a highly reproducible manner. Thus, many software applications are now available for phones (also called "smart phones" or "Smartphones") and tablets. These applications make it possible to read optical-reading codes and to use the data contained therein. To do this, these applications use the photographic optical sensor (or video camera), and restore the information on the basis of the image or sequence of images taken. This type of application makes it possible to avoid optical character recognition (OCR), and enables for example to provide a link to a website or another link in a magazine or in a shopwindow, without the user having to enter the address or to make any other effort.

One of the main drawbacks associated with optical-reading codes is that they are unsightly. As a matter of fact, the algorithms corresponding to the various formats produce black and white squares matrices that are meaningless to the person watching same. For example, it is difficult to associate graphic elements of the universe of the code publisher with a given code.

Moreover, associating a graphic display—whether a drawing or a photograph—with an optical-reading code is complex, and generally makes the code illegible, or severely limits the amount of information it can contain. For these reasons, every effort to customize optical-reading codes have so far been rather trials and errors, through tests and failures, until a functional and aesthetically pleasing enough code has been obtained. In this context, no solution currently exists to produce graphically-customized optical-reading codes, still less such codes that are adapted to be printed in lots, for example, in several thousands of copies of seemingly similar codes, but each containing various information.

The invention improves the situation. To this end, the invention provides for an optical-reading code preparation device comprising:
  a storage unit able to receive data to be coded, and parameter data comprising presentation data,
  an encoding unit able to produce code data on the basis of data to be coded and parameter data,
  an imaging unit able to produce data defining an image plane on the basis of presentation data and/or code data,
  a scheduler devised so as to, in response to the receipt of data to be coded and of parameter data comprising presentation data:
    call the encoding unit with the data to be coded and the parameter data received so as to produce associated code data,
    call the imaging unit with the associated code data, selectively with some at least of the presentation data so as to produce data regarding a bright information plane and/or data regarding a dark information plane,
    call the imaging unit with some of the designated presentation data defining an image so as to produce data regarding a bright information plane and/or data regarding a dark information plane, and
    prepare the code on the basis of an arrangement, in a predetermined order, of the data regarding a bright information plane, the data regarding a dark information plane, the data regarding a bright image plane, and the data regarding a dark image plane.

The invention also relates to a method for preparing an optical-reading code, which comprises:
  receiving data to be coded, and parameter data comprising presentation data,
  calculating code data on the basis of data to be coded and parameter data,
  producing data regarding a bright information plane and/or data regarding a dark information plane on the basis of the code data, and selectively on the basis of some at least of the presentation data,
  producing data regarding a bright image plane and/or data regarding a dark image plane on the basis of some at least of the presentation data defining an image, and
  preparing the code on the basis of an arrangement, in a predetermined order, of the data regarding a bright information plane and/or the data regarding a dark information plane, and/or the data regarding a bright image plane, and/or data regarding a dark image plane.

BRIEF DESCRIPTION OF THE DRAWINGS

Other characteristics and advantages of the invention will become more apparent when reading the following description, taken from examples given for illustration and not restriction, from the drawings wherein.

DETAILED DESCRIPTION

The drawings and the description below mainly contain characteristic elements. They can therefore be used not only for a better understanding of the present invention, but also to contribute to the definition thereof, if need be. This description is likely to involve elements that may be protected by royalties and/or copyrights. The rights holder has no objection to the identical reproduction of this patent document or the description thereof, as it appears in the official records, by anyone. For the rest, he/she fully reserves his/her rights.

Figure 1:
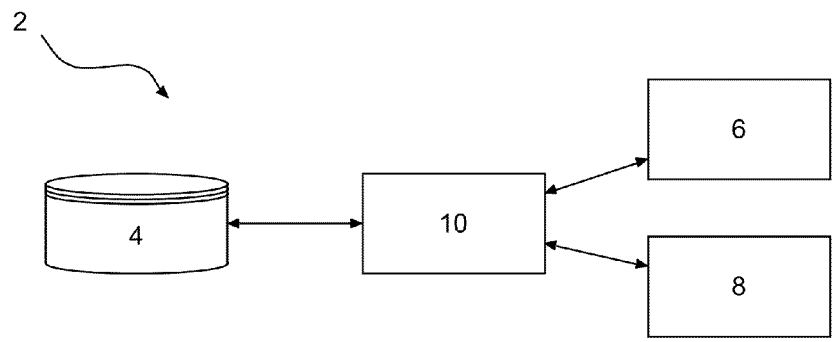
FIG. 1 shows a diagram of a device according to the invention.

FIG. 1 shows a device according to the invention. As can be seen in this Figure, the device 2 comprises a storage unit 4, an encoding unit 6, an imaging unit 8 and a scheduler 10.

In the example described here, the storage unit 4 is a conventional storage medium, which may be a platter or flash memory hard disk (SSD), a flash or ROM memory, a physical storage medium such as a compact disk (CD), a DVD, a Blue-Ray disk, or any other type of physical storage medium. The storage unit 4 may also be transferred to a system area network (SAN) or to the Internet or generally to the "cloud."

In the present example, the encoding unit 6, the imaging unit 8 and the scheduler 10 are software elements executed by a computer containing same. However, they could be implemented in a distributed way on multiple computers, or be in the form of printed circuits (ASIC, FPGA or any other one), or dedicated microprocessors (NoC or SoC). The scheduler 10 selectively controls the encoding unit 6 and the imaging unit 8, and accesses the storage unit 4 to implement the processing according to the invention.

Figure 2:
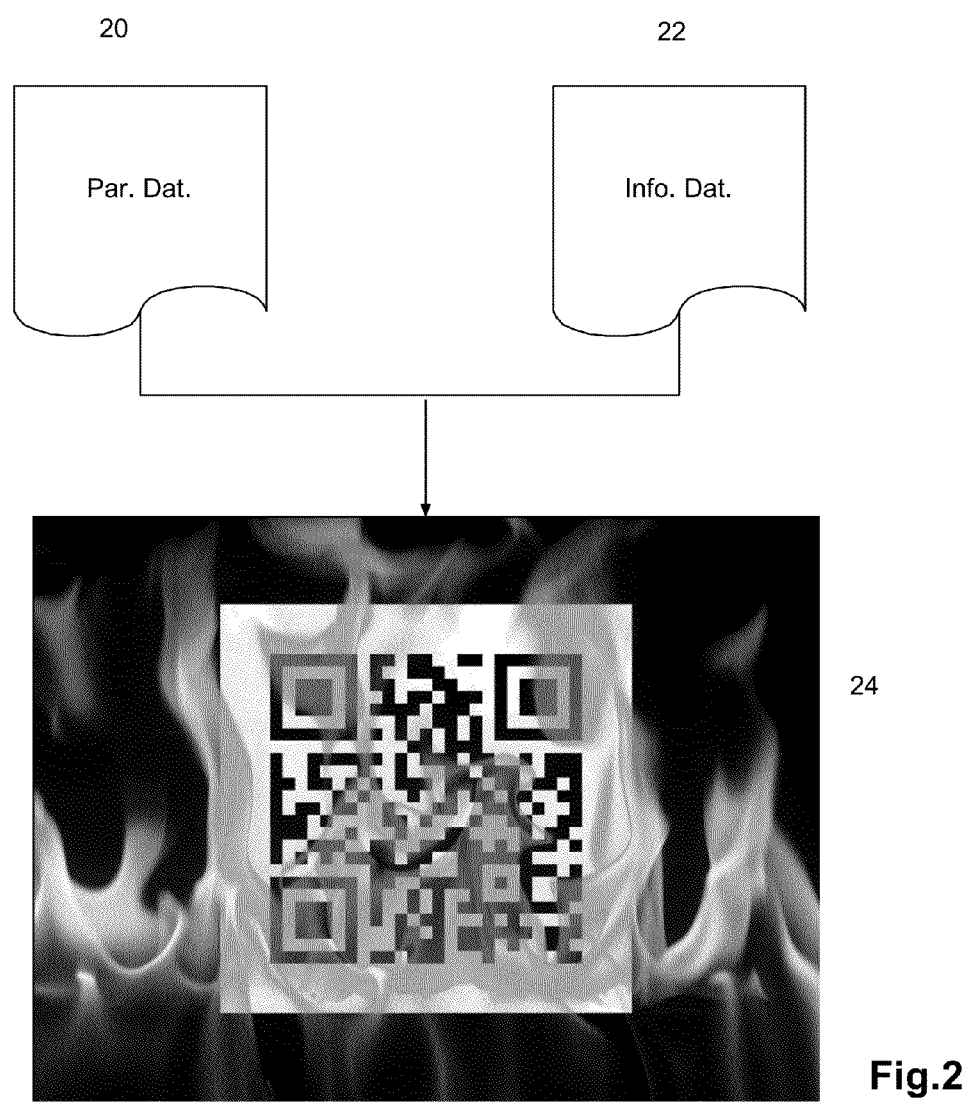
FIG. 2 shows a schematic diagram of the operation of the device of FIG. 1.

FIG. 2 shows the processing performed by the device 2. As can be seen in this Figure, the device 2 receives on the one hand parameters data 20 and on the other hand, data to be coded 22, and outputs a code 24.

The parameter data 20 consist of all the presentation data making it possible to customize the optical-reading code to be produced, as well as any parameter specific to the execution of the device 2. For example, the parameter data 20 may include, without limitation, code background data, code foreground data, image data, pattern data, pattern transformation data, or any other data. The execution-specific parameters may include data of the type of code to be produced, batch data, block data, or any other data. The nature and the function of these data will be specified in the following.

The data to be coded 22 are the data the code 24 must contain. These data may form a business card file, or a Web address, or any other information defined by one or more text strings, bit strings or any other string. Although the code 24 is shown in FIG. 2 in its final form, as it will be seen by a physical person, it should be understood that the code 24 produced by the device 2 may be any element enabling to obtain a functional optical-reading code. Thus, the code 24 may be available in the form of vector graphics, as a bitmap image, or still in the form of a document wherein multiple layers are defined, but not yet merged, and in any form of data which may be assembled to obtain such elements.

Figure 3:
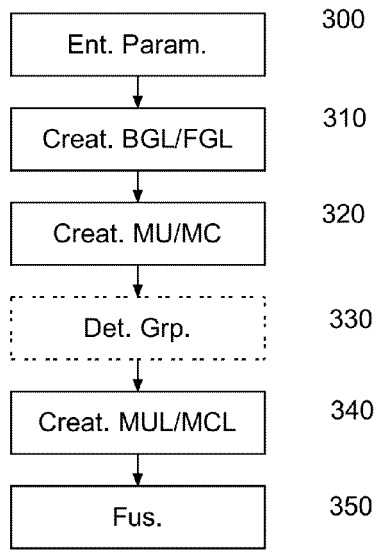
FIG. 3 shows an algorithm for the preparation of optical-reading codes implemented by the device of FIG. 1.

FIG. 3 shows a diagram of an exemplary algorithm implemented by the device 2 to prepare an optical-reading code. This algorithm begins with an operation 300 wherein the parameter data 20 are entered by the user, either directly or by indicating the location of a source containing these data. These data will condition the preparation of the code 24 and the final rendering effect.

As already seen, such data may include code background data, code foreground data, image data, pattern data, pattern transformation data, data of the type of code to be produced, batch data and block data. As a matter of fact, the applicant has identified several ways to graphically customize an optical-reading code, through for example the addition of a background or a foreground, or by using one or several patterns for the achievement of the modules.

The background data and the foreground data may include, for example, a chosen colour background, in the form of a bitmap or a vector, or a continuous-tone image. For a given code, only background data, or foreground data may be provided. As a matter of fact, the most frequently chosen colour to represent a "0" piece of information is the white colour, which comes to have a transparent background or foreground. However, if a background and a foreground are provided for, one of them has to be detected as "bright", i.e. as a "0" piece of information, and the other one has to be detected as "dark", i.e. a "1" piece of information.

The image data may include any graphic type data in the form of a bitmap or a vector, which enables to reproduce one or more photographs, or drawings associated with a company, such as a logo, a model, a brand mark or any other image. As will be seen later, the dimensions of the image associated with the image data may be any dimensions, as compared to the dimensions desired for the code 24, i.e. they may be smaller, the same or larger.

Pattern data may include all graphic type data, in the form of a bitmap or a vector, which can be used to form patterns intended to represent the modules or groups of modules that make up the information in the optical-reading code. The pattern transformation data may include any function and parameter enabling to apply a geometric and/or optical transformation to a pattern. These transformations include, for example, rotation about an axis, translation, homothety, light projection, shadows projection, soft-focus, distortion, transparency, turbulence, etc., or a composition of such transformations.

Using pattern data and transformation data to form original patterns is possible thanks to the intrinsic tolerance of information detection. As a matter of fact, when an optical-reading code is decoded, it is first divided into a plurality of areas corresponding to each of the boxes in the matrix. Then, each area is determined as dark or bright, which differentiates a "1" piece of information and a "0" piece of information. The result of this is that almost any graphic element can be used to represent a module, insofar as this element has a colour profile that will be properly decoded, and as this element occupies a sufficient space in the concerned area.

For example, a red heart can be used to replace the black modules, insofar as such hearts cover a sufficient portion of each area. This principle similarly applies to the transformations described above. The result of the foregoing is that a pattern can also "go past" the area which it corresponds to, insofar as this pattern does not change the information of the area(s) beyond which it extends.

The concept of "bright" and "dark" discovered by the Applicant is crucial. As a matter of fact, it has long been considered that, to reliably, i.e. without risking too many mistakes, produce a functional optical-reading code, the modules must be completely black to be detected as a "1" piece of information and totally white to be detected as a "0" piece of information. In addition, today it is also considered as essential for the modules to be square-shaped, and identical to each other within a given code. As a matter of fact, if these conditions are not met, it becomes necessary to make several series of approximations to obtain a functional code.

For example, the integration of an image, even a small one is made through trials and errors: the image is integrated, usually in the middle of the code, and then the code is tested. This test is usually negative. Then the image is modified, often by trimming, and then the process is repeated, until a functional and more or less aesthetic code is obtained.

The approach clearly results more from art than computer graphics. And it is impossible to create a lot of media that have optical-reading codes both customized for people, for example with their business cards, and graphically customized, for example with the logos of their companies.

The Applicant has discovered that these concepts are erroneous, and that the "bright" parts, and the "dark" parts should actually be distinguished. As a matter of fact, the applicant has found that it is possible to achieve the following equivalences:

- a "bright" part will be detected as a "0" piece of information, and
- a "dark" part will be detected as a "1" piece of information.

In the following, "0" or "bright" data will therefore designate a module carrying a "0" piece of information and "1" or "dark" data will therefore designate a module carrying a "1" piece of information.

This discovery is fundamental, and enabled the applicant to produce customized optical-reading codes, wherein the graphic element used for representing the modules is no longer limited to a black square occupying a space having given dimensions, but almost any graphic element having appropriate properties. These optical-reading codes could also be customized by the free integration of graphic elements not linked to the modules, such as images.

The data of the code 24 to be produced make it possible to specify the type of the code 24 output as described above: bitmap image, vector drawing, document including not smoothed layers, etc. Batch data make it possible to indicate that several codes must be made using the same parameters and different data to be coded 22. It thus becomes possible to print media with customized information using the optical-reading code, but with the same type of batch graphic customization.

In the case of batch processing, only the data to be inserted into the code change, but the graphic customization data and the visual rendering remain the same. As discussed below, the invention enables to reliably produce a significant amount of similarly customized codes as regards graphics, and differently customized as regards the data, as well as reliably, i.e. without error or through tests and failures.

The block data enable to indicate the number of modules that are reserved around the code. Conventionally, the block data consist of two or four modules containing a "bright" or "0" piece of information, around the information matrix, i.e. around the code.

Once the parameters are set, the algorithm continues in an operation 310 with the creation of a background layer and a foreground layer. As a matter of fact, the applicant has found that it is possible to customize the optical-reading code in an extremely rich and free way, insofar as certain rules are followed. These rules mainly relate to preserving the detection of the "bright" and "dark" information.

Figure 4:
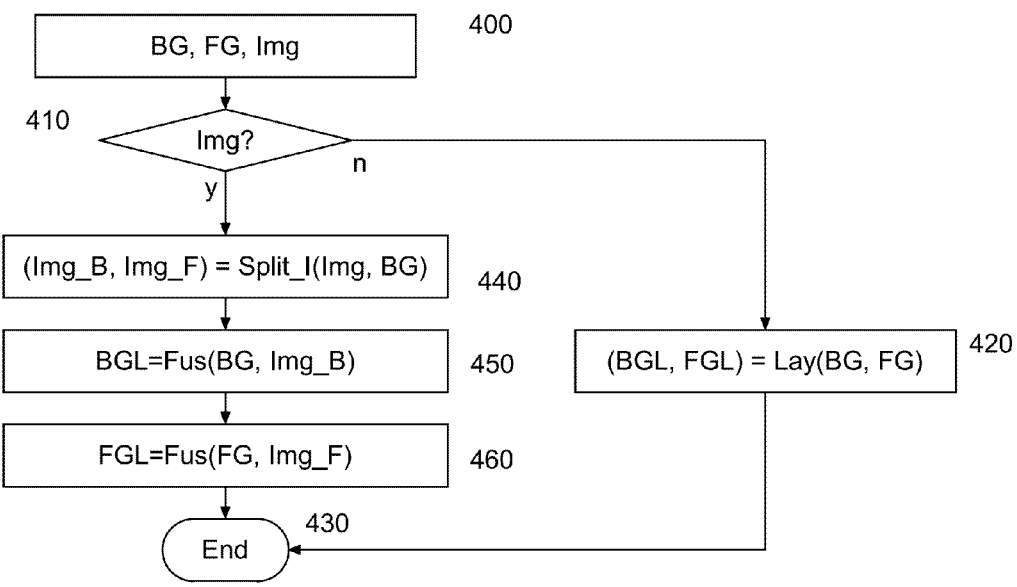
FIG. 4 shows an embodiment of a first operation of FIG. 3.

FIG. 4 shows an exemplary implementation of the operation 310. In an operation 400, the foreground data, the background data and the image data associated with the code to be prepared are recovered.

Then, an operation 410 tests the presence of image data. As a matter of fact, if these data are not available, then the background layer and the foreground layer are directly executed in an operation 420 using a Lay( ) function and the operation 310 ends in 430. If no background data or foreground data are available, the Lay( ) function does nothing, or returns a transparent layer.

If image data have been combined, then a Split_I( ) function is executed in an operation 440. The Split_I( ) function receives the image data and the background data as arguments. The Split_I( ) function will produce two layers on the basis of the image data, depending on the type of information associated with the background data. Thus, if the background data correspond to "dark" information, then the Split_I( ) function creates a Img_B layer which contains the image data corresponding to "dark" information, and a Img_F layer that contains the image data corresponding to "bright" information.

An exemplary method for executing the Split_I( ) function consists in taking the image data, and cutting them according to the modules matrix to define a set of areas in the image data. Then, each area is tested to determine if it contains the image data corresponding to "bright" information, or image data corresponding to "dark" information. Finally, the Img_B and Img_F layers are reconstructed on the basis of this determination.

Finally, a BGL background layer is calculated using a Fus( ) function in an operation 450, a FGL foreground layer is calculated using the Fus( ) function in an operation 460 and the operation ends in 430. The Fus( ) function is executed by smoothing the planes that are passed as arguments in the order of submission. In the example described here, the Img_B layer is smoothed on the BG layer, and the Img_F layer is smoothed on the FG layer.

Once the background and foreground layers are produced, the preparation of the optical-reading code continues in a data matrices creation operation 320. The operation 320 comprises two steps. In a first step, the data to be coded 22 are transformed into an information matrix in accordance with the code format selected. Then, an additional matrix is generated, the role of which will be explained hereunder.

Figure 5:
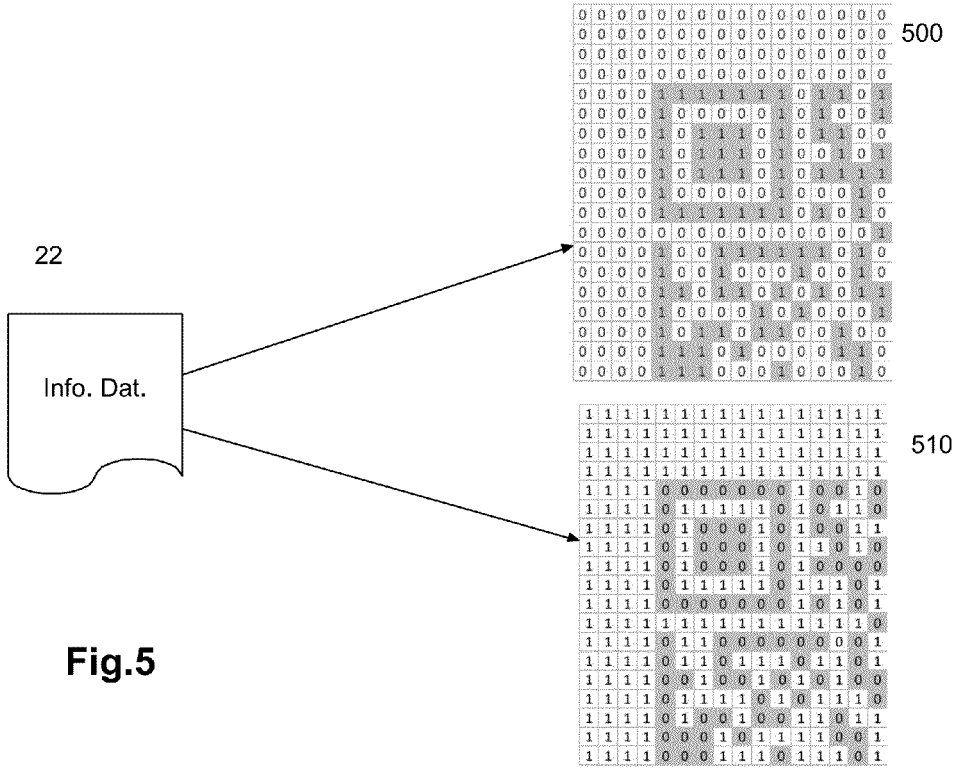
FIG. 5 shows a schematic diagram of a second operation of FIG. 3.

FIG. 5 shows a schematic diagram of implementation of the operation 320, where the information matrix is referenced 500 and the additional matrix is referenced 510. In this operation, if block data are defined, they are integrated in the matrices, which are partially shown here.

It should be noted that although all the coefficients are shown in FIG. 5, only those which are not null will be effectively discussed in the following. The matrices 500 and 510 could also be represented in the form of a series of clues that indicate the locations of the non null coefficients, which are the locations in the code wherein the modules should be represented. The data representing the matrices 500 and 510 are the code data. The example described here is suitable for the QR-Code format. Other code formats will induce different matrices.

Then, an optional operation 330 is executed. The operation 330 is a group detection operation. As a matter of fact, it may be interesting to combine several pieces of information of the "1" or "0" type which are contiguous, depending on the pattern selected to form the code.

Thus, in one example implemented by the applicant, the patterns are pencil lines. When several lines are aligned vertically or horizontally, it may be interesting to combine these into one long continuous line. Similarly, when an image is used as a pattern, for example a hamburger, it may be interesting to combine identical pieces of information which form a square to substitute a single image therefor, whereon homothety is executed. Alternately, other forms, for example similar to Tetris (trademark) type elements shapes may be detected and used.

Figure 6:
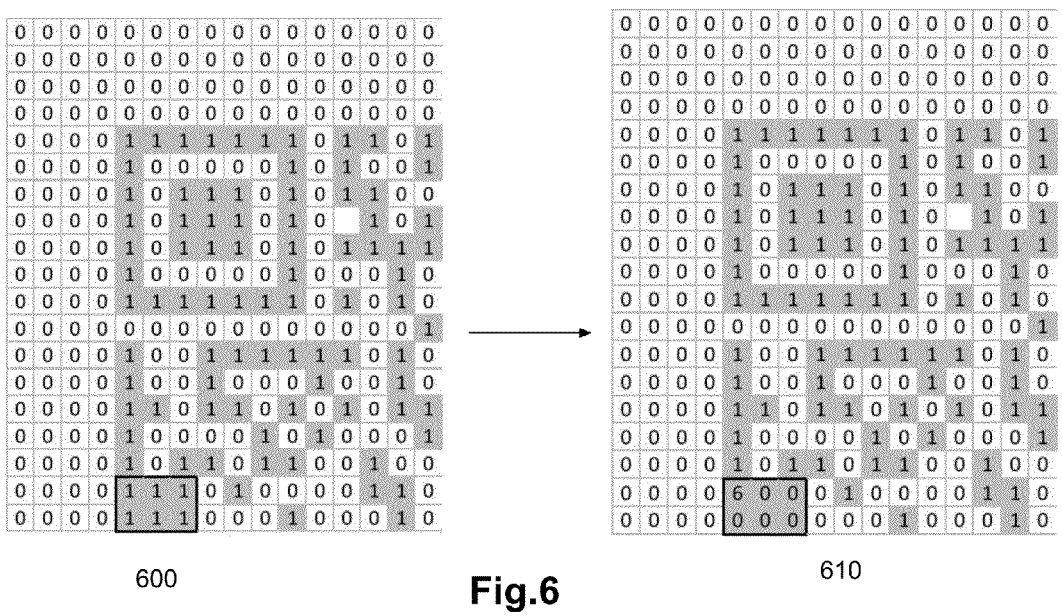
FIG. 6 shows a third operation of FIG. 3.

The operation 330 facilitates this implementation by detecting these groups in the matrices produced with the operation 320. FIG. 6 shows a schematic diagram of the implementation of the operation 330, where the matrix before detection is referenced 600 and the matrix after detection is referenced 610. In the example described here, a single coefficient comprising group detection information is substituted for a group of coefficients, and the other coefficients are nullified. As in FIG. 5, the matrices 600 and 610 are shown in parts, and in the matrix 600, a rectangular block of 3*2 modules size has been identified. Other alternative solutions may be implemented.

The group detection operation 330 is generally carried out on the information matrix 500, since the modules corresponding to "1" information are generally made with a "dark" colour. In the example described here, only the matrix 500 is the object of a detection group, and the matrix 510 remains unchanged. In alternative solutions, the matrix 510 or both matrices 500 and 510 could be the object of the operation 330.

Then an operation 340 is performed, wherein the MUL useful information layer and a MCL additional information layer are generated.

Figure 7:
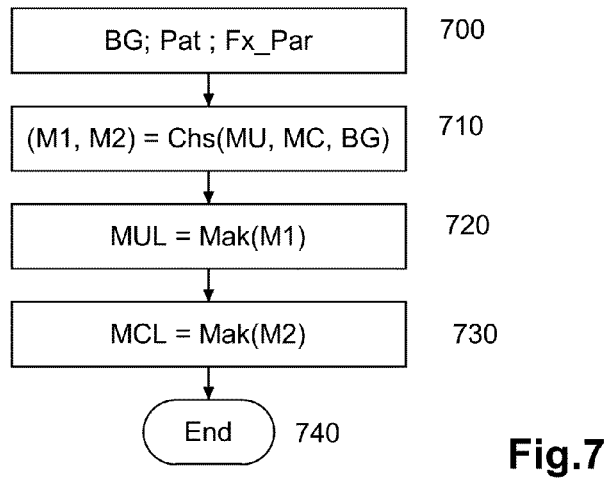
FIG. 7 shows an exemplary implementation of a fourth operation of FIG. 3.

FIG. 7 shows an exemplary implementation of this operation. This operation starts in 700 with the recovery of the BG background data, the Pat pattern data and the Fx_Par transformation data. In the example described here, the Pat pattern and the Fx_Par transformation data are tables.

Then a Chs( ) function is executed in a operation 710 to determine the matrix which will be used as a basis for the preparation of the information layer. As a matter of fact, if the BGL background layer corresponds to "bright" information, then this is the MU useful information matrix. If not so, the MC additional information matrix is used.

The Chs( ) function therefore receives the MU useful information matrix, the MC additional information matrix (if need be as modified after the operation 330), and the BGL background layer as arguments. The Chs( ) function returns two matrices, M1 and M2, the MI matrix comprising the MU matrix if the information of the BGL background layer are bright, and the MC matrix if not so. In the absence of a background layer, or if the layer is transparent, then the M1 matrix is the MU matrix.

Then, in an operation 720, the matrix M1 is transformed into an information plane by a Mak( ) function. At first, the Mak( ) function transforms the M1 matrix into a table in a MI_Tab( ) function. The MI_Tab( ) function receives the MI matrix of the operation 710 and the Pat pattern data and the Fx_Par transformation data as arguments, and returns a MI_Tab[ ] table, wherein each element comprises one or more indices of the MI matrix areas.

In the example described here, each element of the MI_Tab[ ] table is a matrix of identical dimensions to those of MI. In each MI_Tab[i] matrix, only some coefficients are not null and correspond to not null coefficients of MI. When a coefficient of a MI_Tab [i] matrix is not null, it is null in all the other MI_Tab[j] matrices, and the sum of all the MI_Tab[i] matrices gives MI.

Not null coefficients can be assigned in each MI_Tab[i] matrix in a predetermined order, or randomly, and can be performed according to the Pat pattern data and the Fx_Par transformation data. In the latter case, this means that, when processing a batch, all the produced codes will have a common visual form, but they will however be completely different from each other. Each M1 module is therefore in a matrix of the MI_Tab[ ] table, and in one only.

This makes it possible to process all the information of the M1 matrix separately using varied patterns and/or by applying different effects for each not null coefficient of MI. When the operation 330 is performed, the selection of the pattern may depend on the group detection information, and more particularly on the size of the group it refers to.

In a second step, the Mak( ) function generates the MUL useful information layer on the basis of the MI_Tab[ ] table, and of the Pat pattern data and the Fx_Par transformation data to represent the modules with the elements identified by the Pat pattern data according to the Fx_Par transformation data, at the locations designated by the not null coefficients of the MI_Tab[i] matrices.

In the example described herein, the Fx_Par transformation data are so applied that the baric centre of the Pat pattern data is preserved. This ensures that the pattern data prior to the application of the Fx_Par transformation data and the Pat pattern data after the application of the Fx_Par transformation data will be detected in the same way by the code reading application.

In the simplest implementation, there is only one type of pattern and no transformation. In this case, the MI_Tab[ ] table contains a unique matrix identical to the M1 matrix, and the modules are shown at the locations indicated by the M1 matrix with the pattern data.

Then a MCL additional information layer is created similarly in an operation 730 by the Mak(M2) function, and the operation 340 ends in 740. Alternately, the operations 720 and 730 might not return layers, but layers declarations data, if a declarative graphics engine is used.

Once all the background, foreground, and information layers have been created, the operation 350 processes these to provide the code 24 as provided in the data type of data. Thus, if these data indicate that a code 24 in the form of a smoothed image is requested, then this operation smoothes the background layer, the useful information layer, the foreground layer, and the additional information layer. If a not smoothed image is requested, then these layers are provided directly etc. Then again, the code 24 may be defined by a set of layers declarations data if a declarative graphics engine is used.

In addition, some of the operations described above may be optional or performed in a different order to get a better visual effect. For example, as regards the additional information, such information is often desired to be invisible, i.e. transparent. More specifically, additional information have to be displayed only when corresponds to a "bright" piece of information that is located in a code area wherein a background or a "dark" foreground has been applied. When such areas do not exist, the application of the additional information layer may be omitted.

This is reinforced by the fact that background data more often exist than foreground data. As a result, the FGL foreground layer is often reduced to the Img_F part of the image, which reduces the chance for such areas to exist.

In addition it can be noted from the above that it is easy to mass-produce highly customized optical-reading codes thanks to the invention. As a matter of fact, as the production of the code provides for the preservation of the "bright" and "dark" information, whatever the graphic customization considered, it is certain that the codes produced within the scope of the invention are functional. This is very advantageous, and not possible in the state of the art.

Figure 8:
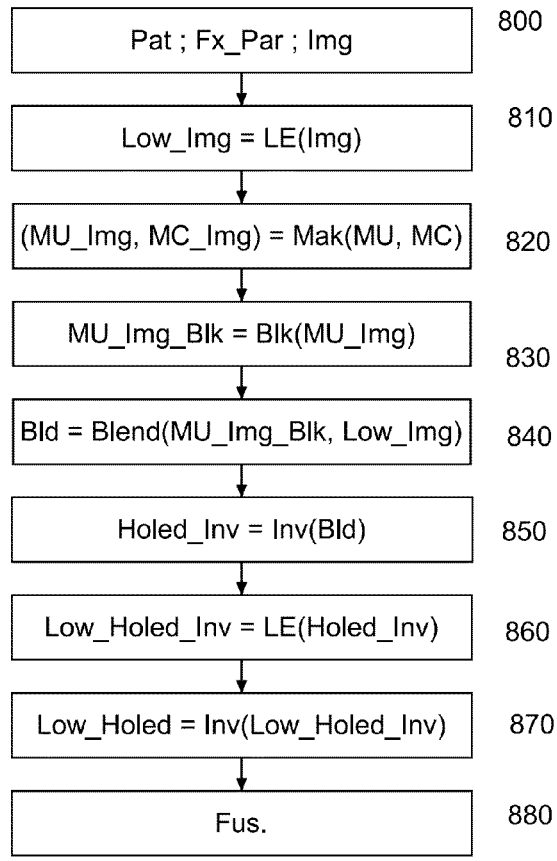
FIG. 8 shows an exemplary implementation of another embodiment.

The applicant has also discovered another advantageous way to produce an optical-reading code. FIG. 8 shows a first embodiment thereof. In an operation 800, the image data, the pattern data, the transformation data, and the data of the MU and MC matrices are received.

Then, in an operation 810, a LE( ) function is applied to the image data. The LE( ) function aims at changing the Img image represented by the image data, by making it progressively transparent. As a result, Low_Img data are obtained, which represent an image wherein all the data of the original image, the brightness of which corresponds to a "bright" piece of information, have been removed by making these progressively transparent. Alternately, this function could make all the elements of the input image, the brightness of which is lower than a selected threshold, transparent, and all the elements of the input images, the brightness of which is greater than the selected threshold, opaque.

Then, in an operation 820, the MU_Img and MC_Img data are calculated by the Mak(MU, MC) function, then the MU_Img data are made black in an operation 830 by a Blk( ) function. The Blk( ) function transforms all the elements of the MU_Img image that are not strictly white into black elements, to provide data defining a MU_Img_Blk image. Thereafter, the MU_Img_Blk data are superimposed on the Low_Img data in an operation 840, then a colour inversion operation is performed in an operation 850 by a Inv( ) function to produce Holed_Inv data. The Holed_Inv data thus contain the colorimetric mirror of the Img image data with transparent holes corresponding to the locations of the "dark" modules of the MU matrix.

In an operation 860, the LE( ) function is applied to the Holed_Inv data, and the resulting High_Holed_Inv data are reversed again by the Inv( ) function in an operation 870 to produce High_Holed data. In practice, the High_Holed data correspond to the "dark" parts of the Img image wherein the modules corresponding to the "bright" information have been represented. Finally, in an operation 880, the MU_Img, Low_Img, MC_Img and High_Holed data layers are smoothed to produce the code 24. As described above, these operations can generate a code 24 in the form of a smoothed image, in the form of a group of ordered layers, or in the form of a set of layers declarations if a declarative graphics engine is used.

Figure 9:
FIG. 9 shows an exemplary implementation of still another embodiment.

FIG. 9 shows a variant of FIG. 8. In an operation 900, the image data, the pattern data, the transformation data, and the MU and MC matrices data are received. At first, this variant aims at calculating the parts of the Img image which are "dark" and which correspond to the locations of "dark" modules in the MU matrix. To do this, in an operation 905, the MU_Img data are calculated by the Mak(MU) function, then the MU_Img data are made black in an operation 907 by the Blk( ) function to provide data defining a MU_Img_Blk image.

Then the Inv( ) function is applied to the MU_Img_Blk data in an operation 910 to obtain MU_Img_Inv data. Typically, the MU_Img_Inv image corresponds to the MC matrix with the block data if any, wherein the "bright" modules are shown in black, and wherein the "dark" modules are shown in white. The LE( ) function is then applied to the MU_Img_Inv data in an operation 915, to make the "bright" modules opaque and the "dark" modules transparent. The resulting data are called Low_MU_Img_Inv.

In an operation 920, the image data of the Img image are colorimetrically reversed by the Inv( ) function to get Img_Inv data and then the Low_MU_Img_Inv data are merged with the Img_Inv data in an operation 925. As a result, Img_Msk_Inv mask data are obtained, which contain the colorimetric mirror of the parts of the Img image which correspond to the "dark" modules of MU. To obtain an image that comprises the parts of the Img image which are "dark" and which correspond to the locations of "dark" modules in the MU matrix, the Inv( ) function is applied to the Img_Msk_Inv data in an operation 930, then the LE( ) function is applied to the resulting Img_Msk data in an operation 935, which results in Low_Img_Msk output data.

In a second step, this variant aims at calculating the parts of the Img image which are "bright" and which correspond to locations of "dark" modules in the MU matrix. To do this, in an operation 940, the MC_Img data are calculated by the Mak(MC) function, then the MC_Img data are made white in an operation 945 by a Wht( ) function. The Wht( ) function transforms all the elements of the MC_Img image that are not strictly black into white elements, to provide data defining a MC_Img_Wht image.

Then the LE( ) function is applied to the MC_Img_Wht data in an operation 947 to obtain High_MC_Img data corresponding to an image, wherein the "dark" modules of MU are opaque, and the "bright" modules of MC are transparent. Then, in an operation 950, the High_MC_Img data are merged with the image data of the Img image to obtain Img_Msk data.

The Img_Msk data contain the parts of the Img image that correspond to the "bright" modules of MC. To obtain an image which comprises the parts of the Img image which are "bright" and which correspond to locations of "bright" modules of the MC matrix, the Inv( ) function is applied to the Img_Msk data in an operation 955, then the LE( ) function is applied to the resulting Img_Msk_Inv data in an operation 960, and the Inv function( ) is applied again in an operation 965, which results in High_Img_Msk output data. Specifically, the Low_Img_Msk data contain all the "dark" data of the Img image, as masked by the image representing the "dark" modules of the MU matrix, and the High_Img_Msk data contain all the "bright" data of the Img image, as masked by the image of the "bright" modules of the MC matrix.

To get the code 24, then the planes simply have to be superimposed in an operation 970, from the deepest to the foremost one:
MU_Img data,
Low_Img_Msk data,
MC_Img data and
High_Img_Msk data.

Alternately, the image data of the Img image can be used as the background for the code 24 thus produced. As a matter of fact, it has been seen that the modules need not occupy the entire space provided in the code, without affecting the quality of the code 24 produced.

Thus, the applicant has found that, within the scope of the production of codes with a fairly large image as a graphic customization, it is advantageous and aesthetic to use modules, the size of which is slightly smaller than the location reserved for them in the code 24. As a matter of fact, with modules that do not occupy the whole location, "not contiguous" modules are obtained, which is visually shown by a gap between the rows and columns of modules, which gives a very good visual rendering.

However, as has just been seen, the variant of FIG. 9 precisely cuts the image along the contours of the modules, so that they fill the locations dedicated to them. Therefore, the superposition of the planes described above then leaves the gaps empty. Reusing the Img image as a background fills these gaps without corrupting the code 24, and even improves the visual rendering thereof.

Again, the code 24 may be provided as specified in the code type data. Thus, if these data indicate that a code 24 in the form of a smoothed image is requested, then this operation smoothes the planes in the order defined above. If a non-smoothed image is requested, then these layers are provided directly etc. Again, the code 24 may be defined by a set of layers declarations if a declarative graphics engine is used.

In the foregoing, smoothing and mergers were alternately referred to. These operations aim as much at a conventional smoothing of the planes, as at the merger with alpha channel management, as appropriate. In addition, in many cases, the operations are performed to produce disjoint, i.e. not overlapping, graphic elements. In this case, using smoothing or a merger with alpha channel management is indifferent. This is for example the case with some of the data of the variant of FIG. 9: the Low_Img_Msk and High_Img_Msk data are completely separate.

The use of planes transparency and separation explains the main difference between the variant of FIG. 8 and the variant of FIG. 9:

In FIG. 8, the processing focuses on the Img image, and the dark portions of the Img image which must be "drilled" with "bright" modules are desired to be preserved. Using the LE( ) function makes sense since the separation in "bright" and "dark" layers is complementary, and reconstructs the Img image when planes are merged. Using other tools than the LE( ) function in this variant might give different results not preserving the Img image in the code 24;

In FIG. 9, the processing focuses on the code useful piece of information, and the Img image is methodically cut according to the "bright" and "dark" modules. Here, the LE( ) function could easily be replaced without any consequence for the integrity of the Img image in the final code 24.

Moreover, if image data are provided, background or foreground data are rarely provided, which still brings these embodiments closer. In any event, the foreground and background data can be processed as image data in the variants of FIGS. 8 and 9.

In addition, all the variants and options described in connection with FIGS. 1-7 can be directly applied to the variants of FIGS. 8 and 9, including those concerning the group detection, the use of various patterns for the modules and the application of transformations. The main difference in these embodiments is that the embodiment of FIGS. 1-7 handles the images in a different way, and relies more on layer smoothing, where the variants of FIGS. 8 and 9 make use of transparency.

Additional variations may also be applied to improve the visual rendering of all the variants described. As a matter of fact, the applicant has found that it may be advantageous to re-apply all or part of the background, the foreground or the image as the foreground on the code prepared according to the invention, with a low opacity, usually lower than 75%. This allows homogenizing the display of the image, without changing the additional information.

Moreover, most optical-reading codes have specific areas which contain information defined by the format and never varying. These areas are usually called a "driver". Their function is to enable an application trying to decode the optical-reading code to place it according to a predefined orientation, in order to read it in the correct order, whatever the orientation in which the code has been photographed.

For example, in the basic QR-code type codes, three areas are provided in the top left, top right and bottom left corners, which include a first square of "dark" information, a second square of "bright" information within the first square, and a square full of "dark" information within the second square. These drivers are shown in FIG. 2, for example. A final driver is also included at the bottom right.

In some optical-reading code formats, these drivers are crucial because, without them, reading the code correctly is impossible. It may be desired, for safety reasons, not to treat the drivers like the rest of the code data. This can be done within the scope of the invention by separating the drivers in the operation 710, as is done for the information matrix. Then, the drivers are smoothed according to their correspondence with a dark or not information.

Furthermore, the combinations and smoothing described above are provided to give an optimum visual rendering for the code 24. However, other less visually optimal solutions can be used, for example by reversing some smoothing.

The result of the above is that the preparation of the code is based on alternating layers of the graphic type and information layers that are associated with opposite information. For example, a bright background is used, whereon dark information, then a dark foreground and bright additional information, etc. are smoothed. The smoothing, pattern and effects variations are free, insofar as this smoothing preserves information.

This preservation of information enables to produce an almost infinite range of graphic customizations, something that has been inconceivable so far. In addition, the invention guarantees the integrity of the code and of the images, and no verification or editing step is required.

Finally, as the invention is compatible with any image, whatever the size thereof, it becomes very easy to integrate an optical-reading code into any graphic support, such as a poster or an advertisement. The relative position of the image forming the medium simply has to be specified and this image will be modified by integrating the code. Thus, you no longer have on the one hand a visual medium and on the other hand a code added to this medium, but an actual merging of the code and the medium wherein it is to be integrated. The invention is of course compatible with not two-dimension optical-reading codes, such as EAN-8, EAN-13, UPC-A, UPC-E, PDF-417 or other codes.

The invention claimed is:

1. An optical-reading code preparation device comprising:
   a storage unit adapted to receive data to be coded, and parameter data comprising presentation data;
   an encoding unit adapted to produce code data on the basis of data to be coded and parameter data;
   an imaging unit adapted to produce data defining an image plane on the basis of at least one of: presentation data and code data;
   a scheduler adapted to, in response to the receipt of data to be coded and of parameter data comprising presentation data:
      call the encoding unit with the data to be coded and the parameter data received so as to produce associated code data;
      call the imaging unit with the associated code data, selectively with some at least of the presentation data so as to produce at least one of: data regarding a bright information plane and data regarding a dark information plane;
      call the imaging unit with some of the designated presentation data defining an image so as to produce at least one of: data regarding a bright information plane and data regarding a dark information plane; and
      prepare an optical-reading code on the basis of an arrangement in a predetermined order of the data regarding a bright information plane of at least one of: the data regarding a dark information plane and the data regarding a bright image plane, and the data regarding a dark image plane.

2. A device according to claim 1, wherein the imaging unit is so arranged as to produce at least one of: data regarding a bright image plane and data regarding a dark image plane on the basis of some at least of the presentation data, and on the basis of the associated code data.

3. A device according to claim 2, wherein the imaging unit is so arranged as to produce at least one of: data regarding a bright image plane and data regarding a dark image plane on the basis of some at least of the presentation data, and on the basis of data regarding a bright information plane and data regarding a dark information plane

4. A device according to claim 1 wherein the presentation data defining an image comprise at least one of: foreground data and background data and image data.

5. A device according to claim 4, wherein the presentation data defining an image, which comprise at least one of: foreground data and background data and image data comprise bitmap image data and vector graphics data.

6. A device according to claim 1, wherein the presentation data comprise at least one of: pattern data and transformation data, and wherein the imaging unit is so arranged as to produce at least one of: data regarding a bright image plane and data regarding a dark image plane on the basis of some at least of the presentation data comprise at least one of: pattern data and the transformation data.

7. A device according to claim 6, wherein the transformation data comprise one of: data of rotation about an axis, translation, homothety, light projection, shadows projection, soft-focus, distortion, transparency, turbulence data, and a composition of such data.

8. A device according to claim 1, wherein the data regarding a bright image plane, and data regarding a dark image plane define disjoint images.

9. A device according to claim 1, wherein the optical code is prepared in at least one of:

the form of an image comprising a smoothing, in a predetermined order, of the data regarding a bright information plane, the data regarding a dark information plane, the data regarding a bright image plane and the data regarding a dark image plane;

the form of a file comprising the data regarding a bright information plane, the data regarding a dark information plane, the data regarding a bright image plane, and the data regarding a dark image plane; and the form of a file comprising a plurality of layers declarations defining at least one of: the data regarding a bright information plane and the data regarding a dark information plane, and the data regarding a bright image plane and the data regarding a dark image plane.

10. A method for preparing an optical-reading code, the method comprising:

receiving data to be coded, and parameter data comprising presentation data;

calculating code data on the basis of data to be coded and parameter data;

producing at least one of: data regarding a bright information plane and data regarding a dark information plane on the basis of the code data, and selectively on the basis of some at least of the presentation data;

producing at least one of: data regarding a bright image plane and data regarding a dark image plane on the basis of some at least of the presentation data defining an image; and preparing the code on the basis of an arrangement, in a predetermined order, of at least one of: the data regarding a bright information plane and the data regarding a dark information plane and the data regarding a bright image plane and the data regarding a dark image plane.

* * * * *